INVENTOR.
Frederick W. Seybold
BY

Sept. 6, 1955  F. W. SEYBOLD  2,716,906
AUTOMATIC TRANSMISSION
Filed Dec. 12, 1951  9 Sheets-Sheet 2

INVENTOR.
Frederick W. Seybold
BY

Sept. 6, 1955  F. W. SEYBOLD  2,716,906
AUTOMATIC TRANSMISSION
Filed Dec. 12, 1951  9 Sheets-Sheet 3

INVENTOR.
Frederick W. Seybold
BY

Sept. 6, 1955  F. W. SEYBOLD  2,716,906
AUTOMATIC TRANSMISSION
Filed Dec. 12, 1951  9 Sheets-Sheet 4

INVENTOR.
Frederick W. Seybold
BY

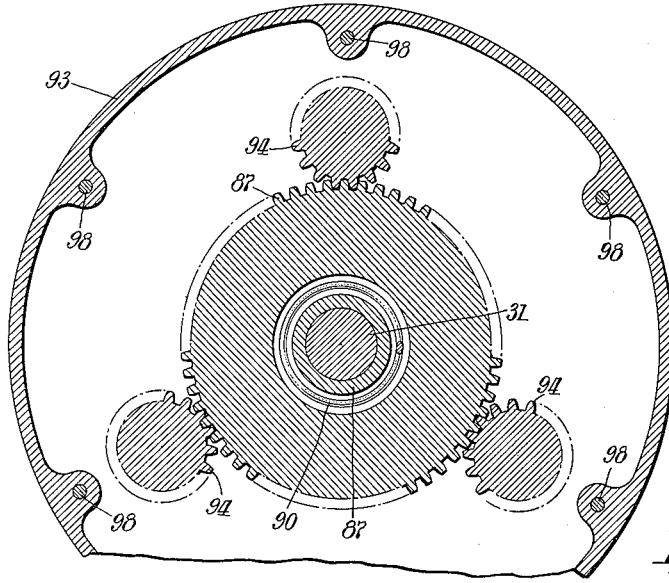
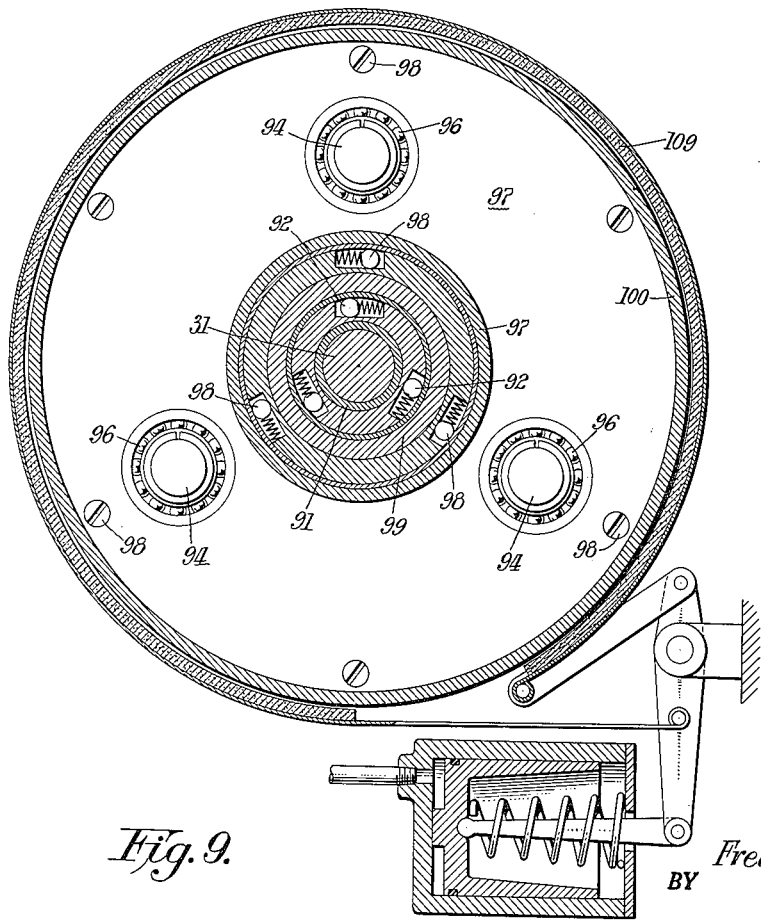

INVENTOR.
Frederick W. Seybold
BY

Sept. 6, 1955            F. W. SEYBOLD            2,716,906
AUTOMATIC TRANSMISSION
Filed Dec. 12, 1951                                        9 Sheets-Sheet 7

INVENTOR.
Frederick W. Seybold
BY

Sept. 6, 1955

F. W. SEYBOLD 2,716,906

AUTOMATIC TRANSMISSION

Filed Dec. 12, 1951

INVENTOR.
Frederick W. Seybold
BY

Sept. 6, 1955  F. W. SEYBOLD  2,716,906
AUTOMATIC TRANSMISSION
Filed Dec. 12, 1951
9 Sheets-Sheet 9

| POSITION | | CLUTCH AND BRAKE ENGAGEMENTS | | | | | TORQUES ENGINE TORQUE = 100 | | | | | | | |
|---|---|---|---|---|---|---|---|---|---|---|---|---|---|---|
| RATIO | INVERSE RATIO | CLUTCH 16-79 | CLUTCH 84 | BRAKE 109 | BRAKE 110 | BRAKE 111 | IMPELLER 13 | RUNNER 34 | RUNNER 46 | BRAKE 109 | BRAKE 110 | BRAKE 111 | CLUTCH 16-79 | CLUTCH 84 | OUTPUT 31 |
| LOW .333 | 3:1 | ON | RIGHT | ON | OFF | OFF | 100 | 100 | INACTIVE | 200 | — | — | — | 300 | 300 |
| 1-INTERMEDIATE .667 | 1.5:1 | ON | RIGHT | ON | OFF | OFF | 100 | INACTIVE | 100 | 50 | — | — | — | 150 | 150 |
| 2-INTERMEDIATE .714 | 1.4:1 | OFF | LEFT | ON | ON | OFF | 100 | 100 | INACTIVE | 20 | 20 | — | — | 140 | 140 |
| DIRECT 1.000 | 1:1 | ON | RIGHT | ON | OFF | OFF | 177 | INACTIVE | 177 | — | — | — | 77↓ | 100 | 100 |
| OVER DRIVE 1.428 | .7:1 | OFF | LEFT | ON | ON | OFF | 100 | INACTIVE | 100 | — | −30 | — | — | 70 | 70 |
| REVERSE −.333 | 3:1 | OFF | RIGHT | OFF | OFF | ON | 100 | 100 | INACTIVE | — | — | −400 | — | −300 | −300 |
| | | 3 | 4 | 5 | 6 | 7 | 8 | 9 | 10 | 11 | 12 | 13 | 14 | 15 | 16 |
| 1 | 2 | | | | | | | | | | | | | | |

NOTE: ← — DENOTES "FEED BACK"

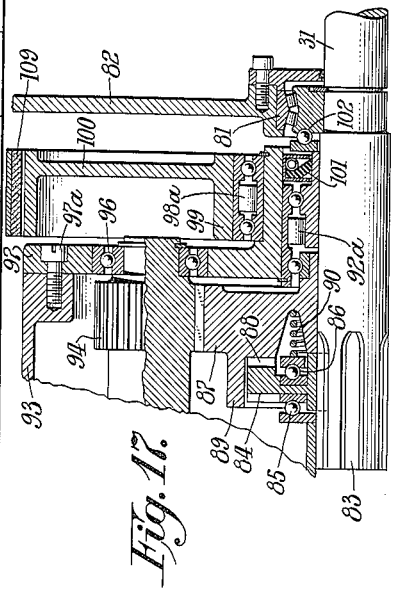

INVENTOR.
Frederick W. Seybold
BY

United States Patent Office 2,716,906
Patented Sept. 6, 1955

2,716,906

AUTOMATIC TRANSMISSION

Frederick W. Seybold, Westfield, N. J.

Application December 12, 1951, Serial No. 261,249

25 Claims. (Cl. 74—677)

This invention pertains to automatic variable speed transmissions and particularly to the combination of a fluid coupling and variable speed gearing for use between the power plant and the driven shaft of motor vehicles, such as passenger cars, trucks, and tanks, or other applications where variable torque requirements are encountered.

This invention is a further improvement of the transmission shown in my co-pending application, Serial No. 237,974, filed July 21, 1951, and all of its features are retained in this improvement, but in addition an overdrive speed ratio has been provided without additional gears by the provision of a hydraulically actuated clutch, in view of the fact that overdrives have become very popular because their use results in saving of fuel and in reducing engine wear.

Having the foregoing in mind, it is, therefore, a primary object of this invention to provide a variable speed transmission of extreme simplicity of construction and operation. It is also an object of this invention to provide a power transmission having a full range of forward speeds including an overdrive speed.

A still further object of this invention is the provision of a reverse speed ratio obtained from the same gearing which is used to provide the forward speed ratios.

Another object of this invention is to provide a power transmission in which the progressive gear ratios are made in a smooth and imperceptible manner, devoid of shocks or jerks.

A still further object of this invention is the provision of a fluid coupling having multiple runners which are interconnected with the variable speed gearing so that at least some of the speed changes are effected within the fluid coupling, and wherein the control of these changes is effected externally of said coupling.

In addition to the above features the transmission of this invention provides:

1. Down-hill braking.
2. No-roll-back of the vehicle in all forward ratios.
3. Taxi-push starting of the engine.
4. Manual control of down-shift of the transmission.

These and other objects and advantages will become apparent by reference to the following description taken in connection with the accompanying drawings, in which:

Figure 8 is a transverse section taken on line 8—8 of Figure 1 showing the output stage of the gear unit;

Figure 9 is a transverse section taken on line 9—9 of Figure 1 showing a reaction member and the brake band for locking the reaction member up and the overrunning clutches associated with the reaction member;

Figure 16 shows a tabulation of all the obtainable speed ratios, together with their required clutch and brake settings;

Figure 17 shows an optional arrangement of the overrunning clutches associated with the brake band for locking-up the reaction member.

Figure 1:
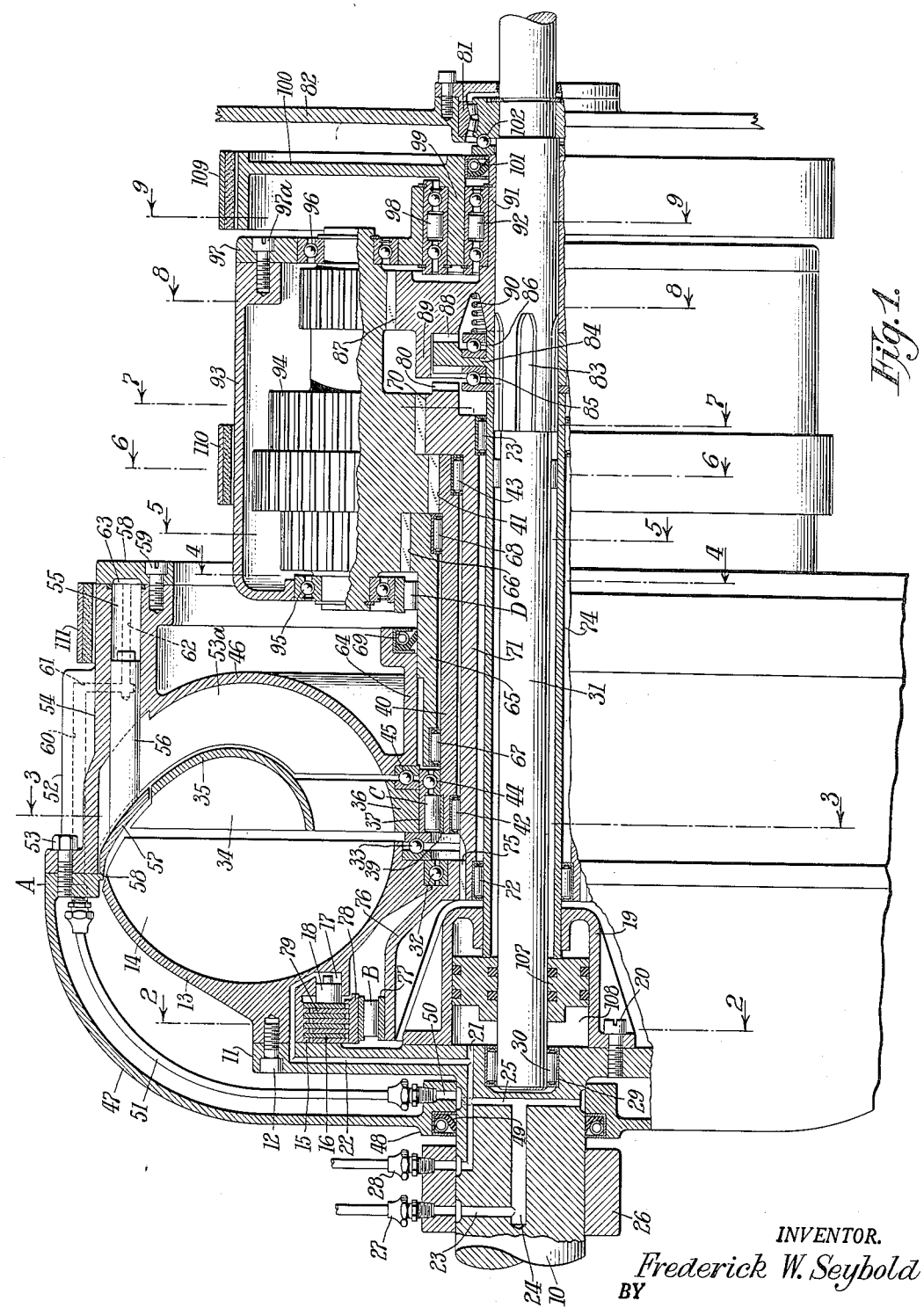
Figure 1 is a vertical longitudinal section through a power transmission constructed according to my invention.
Figure 2:
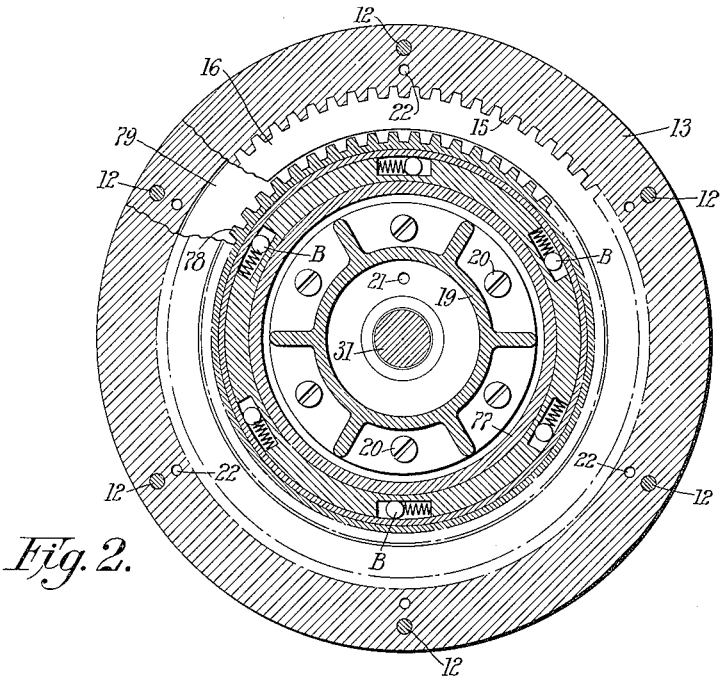
Figure 2 is a transverse section taken on line 2—2 of Figure 1 showing the overrunning clutch which provides direct drive ratio in the transmission and the multiple plate clutch, which when disengaged, provides an intermediate or an overdrive ratio in the transmission.

Referring to Figure 1, the transmission may be divided into nine assemblies, each of which will now be described in detail.

1. *The driving assembly*

The driving assembly comprises the drive shaft 10 which terminates in the vertical flange 11 to which the impeller 13 is secured by the screws 12. Impeller 13 is a member of a 3-element hydraulic coupling designated by "A," and it is provided with radial vanes 14 and internal gear teeth 15 for driving multiple clutch plates 16. A series of small cylinders 17 and pistons 18 are also provided on the impeller 13. A larger cylinder 19 is fastened concentrically by the screws 20 to the drive shaft 10. Bores 21 and 22 are provided in the drive shaft 10 to conduct pressure oil to the cylinders 17 and 19 or permit drainage from these cylinders therethrough.

A series of bores 23, 24, and 25 are also provided and their purpose will be described later. The drive shaft 10 is journalled in bearing 26 to which pressure oil connectors 27 and 28 are attached and are aligned with the bores 23 and 21 respectively. A recess 29 in the end of the drive shaft 10 accommodates the anti-friction bearing 30 which supports the left hand end of the driven shaft 31. The impeller 13 is also provided with a radial ball bearing 32 and a thrust bearing 33 to keep the impeller 13 in correct relationship with the other members of the fluid coupling "A."

2. *The primary floating assembly*

Figure 3:
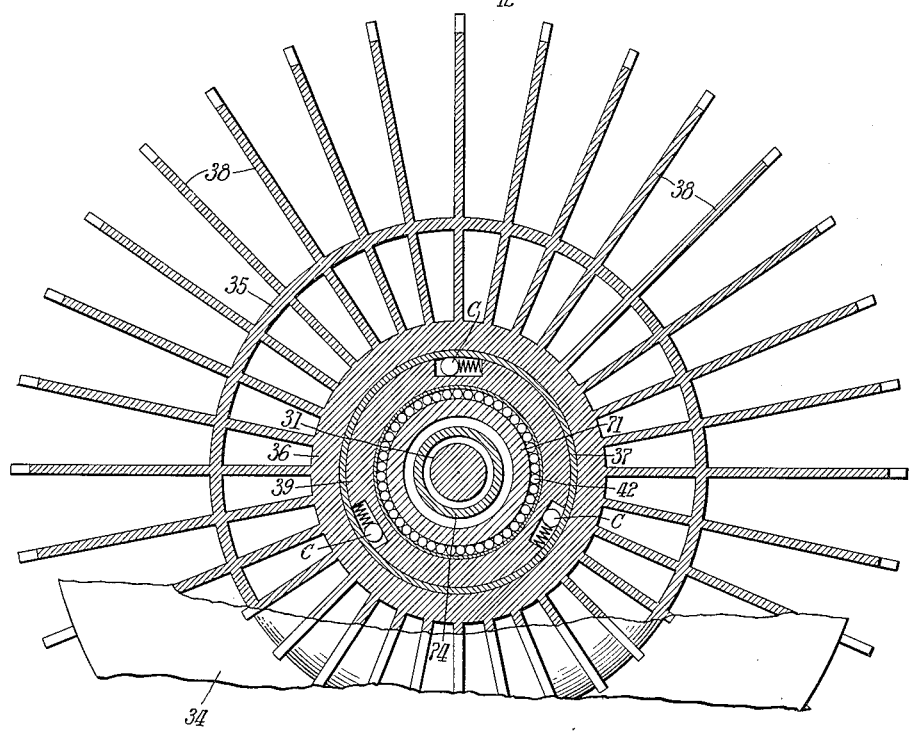
Figure 3 is a transverse section taken on line 3—3 of Figure 1 showing an overrunning clutch positioned between one of the runners of the fluid coupling and its driven member.
Figure 4:
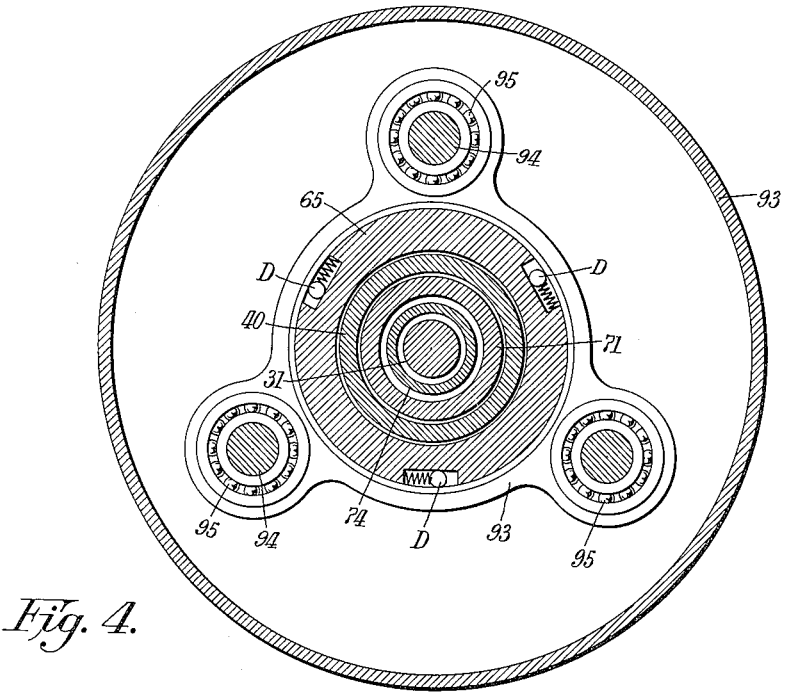
Figure 4 is a transverse section taken on line 4—4 of Figure 1 showing an overrunning clutch which prevents the cluster pinion housing from overrunning the other of the runners of the fluid coupling.
Figure 5:
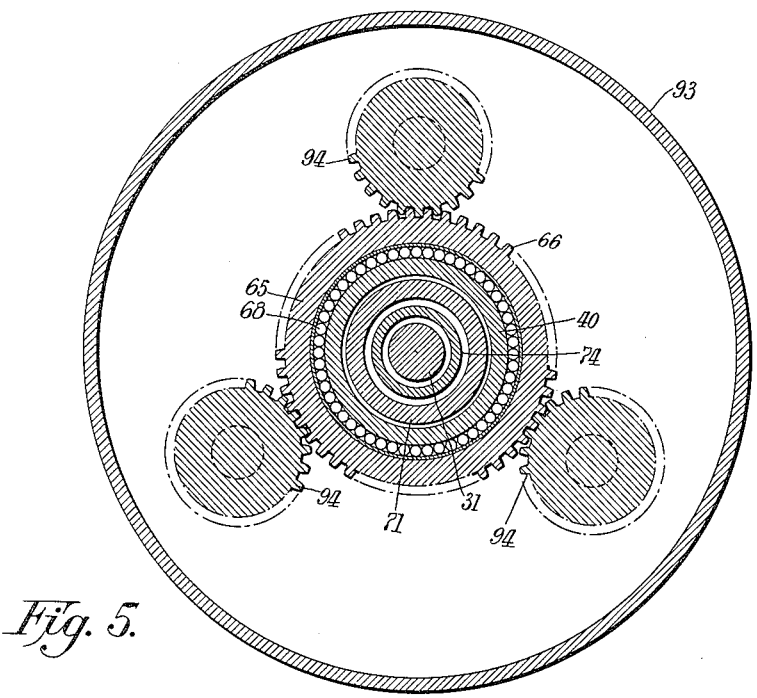
Figure 5 is a transverse section taken on line 5—5 of Figure 1 showing one of the stages of the gear units.
Figure 6:
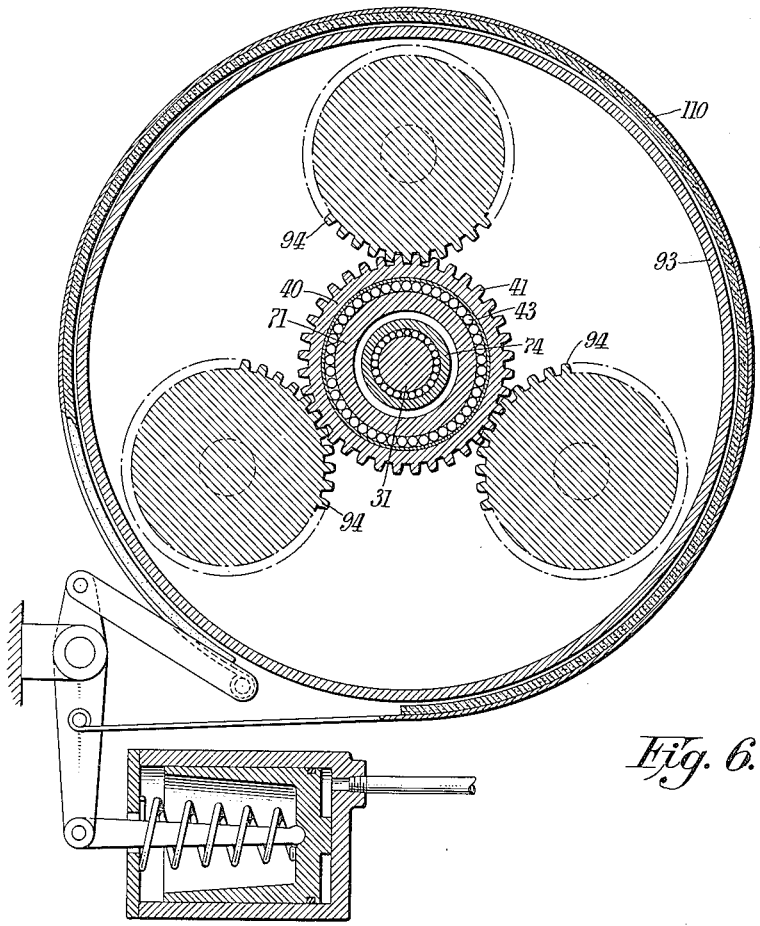
Figure 6 is a transverse section taken on line 6—6 of Figure 1 showing another stage of the gear unit and the brake arrangement for halting rotation of the housing in which the cluster pinion sets are mounted.
Figure 7:
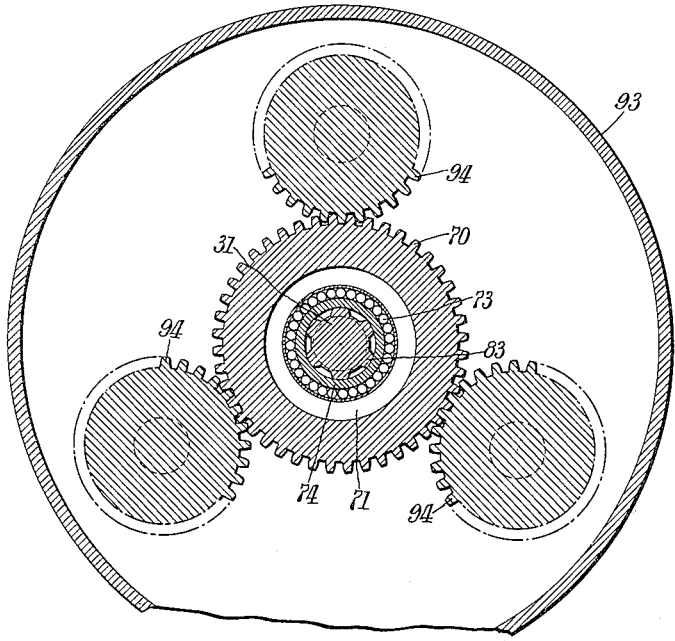
Figure 7 is a transverse section taken on line 7—7 of Figure 1 showing still another stage of the gear unit.

The primary floating assembly consists of the runner 34 which is composed of the toroidal shell 35 and the hub portion 36 into which is fitted the outer member 37 of an overrunning clutch "C," shown in Figure 3. Radial vanes 38 connect the shell 35 and the hub 36. The inner member 39 of the overrunning clutch "C" is secured to the long sleeve 40 of the driving pinion 41 which is recessed on both ends to receive anti-friction bearings 42 and 43. The hub 36 is also recessed to receive the ball bearings 44 and 45 to provide for radial support and end thrust of the runner 34 respectively.

3. *The secondary floating assembly*

The secondary floating assembly consists of the runner 46 which is composed of three sections. The left hand section 47 surrounds the impeller 13 and flange 11 and its hub 48 is journalled on the drive shaft 10 and carries the oil seal 49. Suitable ports 50 cooperate with the bores 25 of the drive shaft 10 and pipe connections 51 conduct pressure oil to the center section 52 of the runner 46. The left hand section 47 is fastened to the center section 52 by a series of screws 53.

The runner 46 is provided with radial vanes 53a and an annular extension 54. Centrally between each pair of vanes and in said annular extension cylindrical bores 55 are provided and into which closely fitted pistons 56 are inserted. Blades or masking vanes 57 are integral with the pistons 56 and are slidably fitted between the vanes 53a and their contour is such as to provide a smooth path to the circulating oil in the coupling. A protrusion 58 on the left hand section 47 acts as a limiting stop for the blades 57 in their most extended position in which these blades align themselves with the contour of the toroidal shell 35 and prevent the circulating oil from entering between the vanes 53a of the runner 46.

The third or right hand section of the runner 46 is the recessed ring 58 which is fastened to the center section 52 by the screws 59. A series of bores 60, 61 and 62 conduct the pressure oil which flows through the pipe connections 51 into the recess 63, whereby said oil may readily enter the bores 55 and act on the pistons 56 therein. Likewise, when the oil pressure is relieved and the centrifugal force of the circulating oil pushes on the blades 57 the pistons 56 will move to the right and then permit access of the circulating oil in the coupling to the vanes 53a of the runner 46.

The center section 52 has a multiple splined hub 64 which mates with the long sleeve 65 of the pinion 66 which is recessed to receive anti-friction bearings 67 and 68 which are journalled on the long sleeve 40 of the driving pinion 41. An oil seal 69 is provided to prevent oil leakage. The inner member of an overrunning clutch "D" is secured to the sleeve of pinion 66.

4. *Direct and overdrive assembly*

The direct and overdrive assembly consists of the pinion 70 which has a long sleeve portion 71 and is recessed on each end for the reception of anti-friction bearings 72 and 73 which are journalled on the long sleeve 74 to be referred to again later. The left hand end of the long sleeve portion 71 is provided with multiple external splines 75 which mate with similar internal splines of the cup-shaped member 76. The inner member 77 of an overrunning clutch "B" is fastened and supported on the member 76.

The outer member of the clutch "B" is provided with external gear teeth 78 for engaging multiple clutch plates 79 alternating with plates 16 previously mentioned to form a multiple plate clutch. When this clutch is engaged, therefore, the pinion 70 cannot overrun the impeller 13. Conversely, when this clutch is released the pinion 70 is free to turn faster than the impeller 13. The ball bearing 32 is supported on the member 76, and the antifriction bearings 42 and 43 are also journalled on the long sleeve 71. Jaw clutch teeth 80 are also provided on the right hand vertical face of the pinion 70.

5. *The driven assembly*

The driven assembly consists of the long driven shaft 31 whose right hand end is supported in the roller bearing 81 which is carried by the stationary transmission housing 82. The left hand portion of the driven shaft is reduced in diameter, the center portion is provided with multiple splines 83 over which is slidably fitted the duplex jaw clutch 84. This clutch is recessed on both sides for the reception of thrust bearings 85 and 86.

6. *The underdrive gear assembly*

The underdrive gear assembly consists of the gear 87 which is free to turn on the driven shaft 31. Its left vertical face is provided with jaw clutch teeth 88 and an extension 89, which acts as a guide for the duplex jaw clutch 84. A V-shaped recess is provided in the gear 87 for the spring 90 which urges the jaw clutch 84 to the left. The gear 87 also has a sleeve extension 91 which provides support for the combination ball and overrunning clutch 92.

7. *The reaction assembly*

The reaction assembly consists of the rotatable housing 93 in which two or more cluster pinions 94 are journalled on anti-friction bearings 95 and 96. For assembly reasons the housing 93 has a detachable end 97 which is fastened to the housing 93 by the screws 97a. The cluster pinions 94 are of suitable proportion and they mesh respectively with pinions 66, 41, 70 and 87, so that the desired speed ratios are obtained.

Assuming that the pinion 66 has 48 teeth and its cluster pinion mate has 24 teeth, and pinion 41 and its cluster pinion mate each has 36 teeth, and pinion 70 has 42 teeth, then its mate will have 30 teeth, the pinion 87 has 54 teeth, then its cluster pinion mate will have 18 teeth.

It is a prerequisite that the sum of the teeth of each pair of gears be the same in the case of straight spur gears, because they must operate on the same center distance. However, if the teeth are helical a greater latitude in ratios will become available by adjusting the helix angle of each pair of gears so that they have a common center distance. The outer member of the overrunning clutch "D" is secured to the housing 93.

The combination ball and overrunning clutch 98 journals the housing 93 on the hub 99 of the brake wheel 100, the latter being journalled on the previously mentioned combination ball and overrunning clutch 92. An oil seal 101 is mounted in the hub 99 of the brake wheel 100 to prevent oil leakage, and a thrust bearing 102 is provided to transfer the thrust of gear 87 to the roller bearing 81.

In Figure 17 the overrunning clutch 92a, which corresponds in function to the overrunning clutch 92 of Figure 1, is placed between the driven shaft 31 and the housing 93, whereas in Figure 1 the overrunning clutch 92 is located between the underdrive gear 87 and the hub 99 of the brake wheel 100. The overrunning clutch 98a is placed between the housing 93 and the hub 99 of the brake wheel 100 and so is the overrunning clutch 98 of Figure 1.

8. *The control assembly*

The control assembly comprises a source of pressure oil usually procured from a gear pump driven by the engine or driven by the transmission itself, and which when directed by manually and automatically controlled valves can be applied to the actuating pistons of the control assembly. The pistons 56 are preferably controlled by a governor 103 which, when it has attained a certain speed, will actuate the valve 104, so that the oil pressure in the bores 55 will be relieved so that the pistons 56 will recede from their extended position and permit entry of the circulating oil of the coupling into the vanes 53a of the runner 46. Under certain driving conditions it may be desirable to "overrule" the governor and continue in or return the transmission to the lower speed ratio. To accomplish this, a foot-operated valve 105 is provided, whereby, when the valve is depressed, pressure oil will pass through valve 105 and hence through valve 104 to the bores 55 and force pistons 56 to the left, thereby blocking the entrance of the circulating oil of the coupling to the vanes 53a.

When the foot is again removed from the valve 105 the spring 106 will return the valve 105 to its "up" position in which the oil in bores 55 can drain off and pistons 56 will be forced to the right by the centrifugal force of the oil in the coupling.

The duplex jaw clutch 84 is controlled by the piston 107 operating in the cylinder 19. The previously mentioned long sleeve 74 is located between piston 107 and thrust bearing 85. The spring 90 will force the clutch 84, the sleeve 74 and the piston 107 to the left at which time the clutch 84 will be connected to the teeth 80 of the pinion 70 when oil pressure is absent in the chamber 108.

When pressure oil is admitted to chamber 108 piston 107 will push on sleeve 74 and disengage jaw clutch 84 from the overdrive gear 70 and engage it with the teeth 88 of the underdrive gear 87. At the same time pressure oil will enter the cylinder 17 on the impeller 13 and pistons 18 will "lock-up" the multiple plate clutch plates 16 and 79, so that the overrunning of overdrive gear 70 with respect to the impeller 13 will be prevented by the overrunning clutch "B."

A brake band 109 for braking the brake wheel 100 is actuated by well-known means, such as fluid operated piston acting on a suitable linkage for tightening the band 109 around the brake wheel 100, whereby the rotation of the reaction assembly in a direction opposite to that of the drive shaft is prevented; but the overrunning clutch 98 will permit the rotation of the reaction assembly in the same direction as that of the drive shaft 10.

A similar brake 110 when applied to the housing 93 will prevent its rotation in either direction and this brake is applied to provide overdrive or down-hill braking.

Another brake 111 when applied to the annular extension 54 of the secondary floating assembly will brake the runner 46 and gear 66 for reverse rotation of the driven shaft 31.

The various speed ratios are obtained by the shifting of the control valve 112 which by means of a linkage is operated by a suitable control lever located on the steering column of the vehicle.

9. The no-roll-back assembly

To prevent the vehicle from rolling backwardly when it has stopped on a hill or incline and the setting of the transmission is for forward operation the overrunning clutch 92 is provided between the underdrive gear 87 and the hub of the brake wheel 100. This clutch 92 prevents the driven shaft 31 from rotating backwardly, because the jaw clutch 84 connects the driven shaft 31 to the gear 87 and the latter cannot turn backwardly as long as the brake wheel 100 is held by the brake band 109. When the transmission is conditioned for reverse operation the brake wheel 100 is released and then allows reverse rotation of the reaction assembly when the brake band 111 is applied to the annular extension 54.

In the arrangement of the overrunning clutches 92a and 98a, as shown in Figure 17, the driven shaft 31 to which one member of the overrunning clutch 92a is secured transmits its reverse torque to the other member of the overrunning clutch 92a which is secured to the housing 93. The reverse rotation of housing 93 is prevented by the overrunning clutch 98a which is installed between said housing and the hub 99 of the brake wheel 100 as long as the brake band 109 is applied thereto.

In other words, the reverse torque of the driven shaft 31 is transmitted through overrunning clutch 92a to the housing 93 and the latter transmits it through overrunning clutch 98a to the brake wheel 100 and when the brake band 109 is applied thereto reverse rotation of the driven shaft 31 is prevented and the vehicle cannot move backwardly when the transmission is conditioned for forward operation, but a release of brake band 109 will then permit reverse operation of the driven shaft 31 and both overrunning clutches 92a and 98a become automatically ineffective.

Overrunning clutch 92a performs an additional function which will be further referred to when the operation of the transmission will be described.

OPERATION

Idling or "neutral" position

Figure 10:
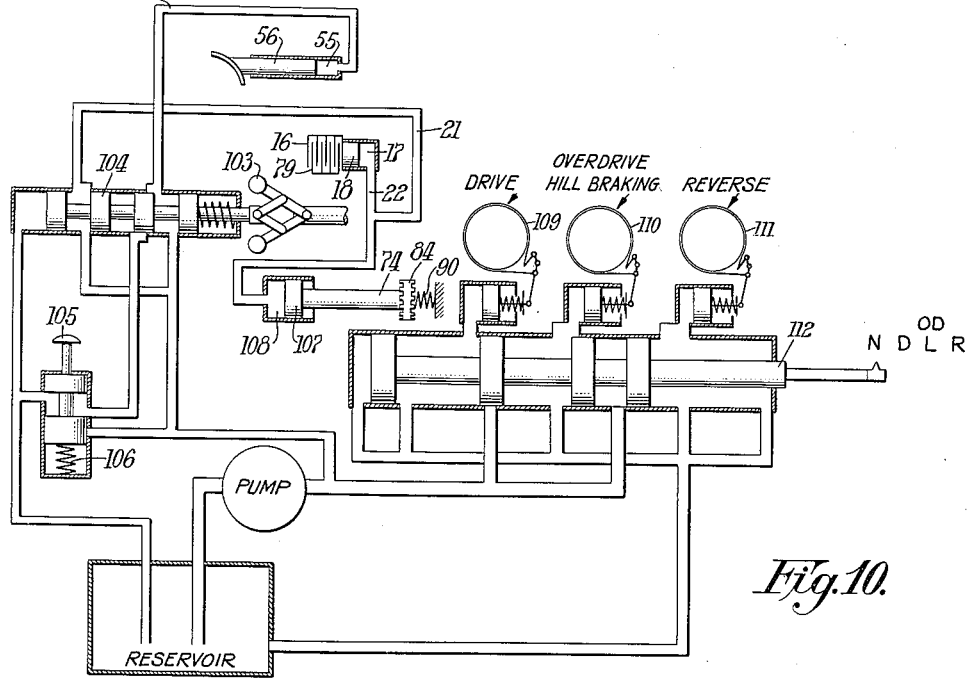
Figure 10 is a schematic arrangement of the hydraulic control mechanism of the transmission in the neutral position.

For "neutral" operation of the transmission the control lever will be set into the "neutral" position as shown in Figure 10, whereby the control valve 112 will be set so that all the brake bands 109, 110, and 111 are released, but pressure oil will be applied to the pistons 18 for "locking-up" of the clutch plates 16 and 79 and to the pistons 56 so that the masking vanes 57 are held against the stops 58.

The driven shaft 31 now remains stationary and with the gear ratios as stated above and with runner 34 and pinion 41 turning with the impeller 13 the reaction assembly will turn in the opposite direction at one-half the speed of the runner 34, and the runner 46 and pinion 66 will turn in the same direction at one-quarter the speed of the runner 34, and the pinion 70 turns in the same direction but at four-seventh the speed of the runner 34.

Forward motion in "low" gear

Figure 11:
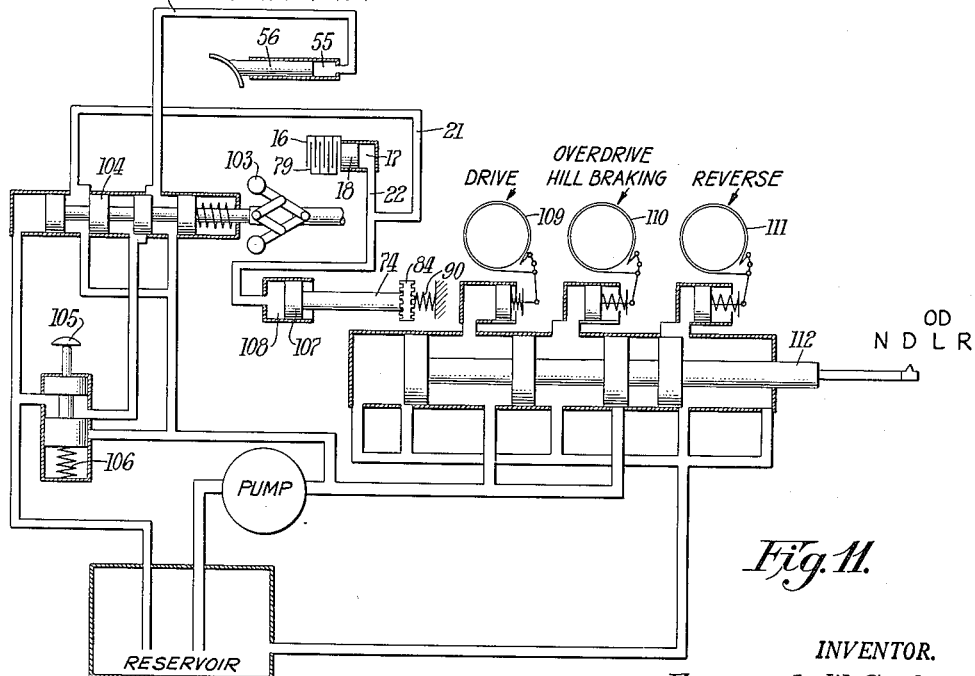
Figure 11 shows the control mechanism in the "Drive" position.

To produce forward motion in "low" gear the control lever is shifted into the "Drive" position as shown in Figure 11, whereby the control valve 112 will be set to deliver oil pressure to the brake cylinder which applies the brake band 109 to stop the reaction assembly from rotating backwards and cause the runners 34 and 46 to come to a stop, because the driven shaft 31 is still stationary due to the application of the foot or parking brake.

Upon release of the above-mentioned brake and depression of the accelerator the runner 34 will speed up and through pinion 41, cluster pinions and pinion 87 will drive the output shaft 31 through the duplex jaw clutch 84 at reduced speed but increased torque. As previously assumed, if the pinion 41 and its mating cluster pinion each have 36 teeth, the underdrive pinion 87 has 54 teeth and its cluster mate has 18 teeth, therefore, when the housing 93 is at rest the shaft 31 turns at one-third the speed of the runner 34, but its torque is three times as great. The speed of the runner 46 is now one-half the speed of the runner 34 and the pinion 70 turns at five-seventh the speed of the runner 34.

Forward motion in "intermediate" gear

Figure 12:
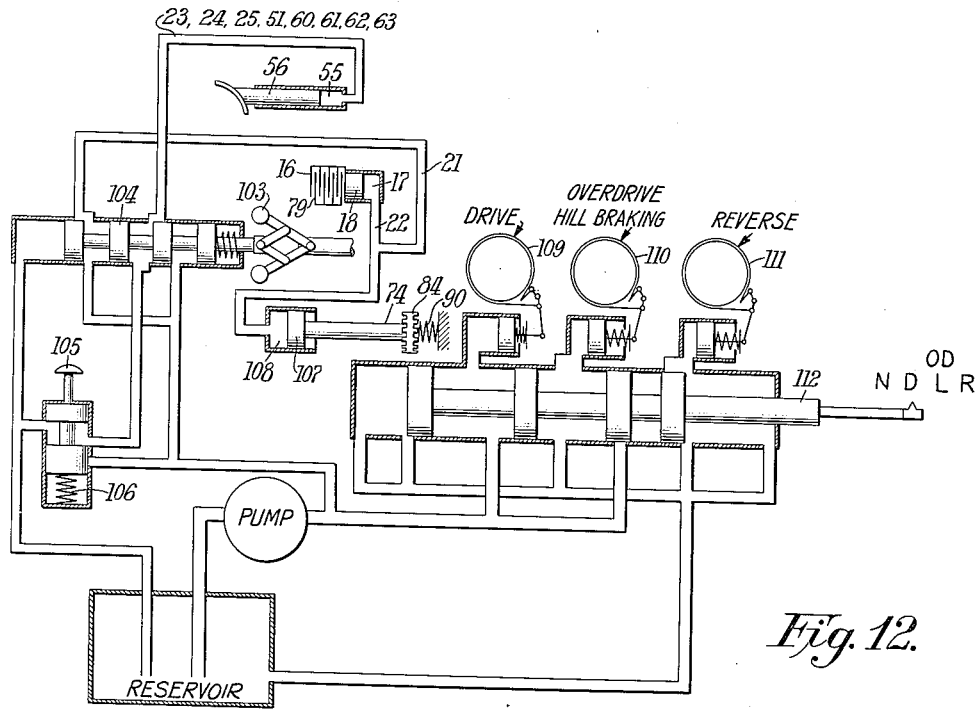
Figure 12 shows the control mechanism in an intermediate position.

As the car speed increases to say about ten miles per hour the governor 103 will shift the valve 104 to the position shown in Figure 12, whereby the oil pressure is relieved in the pipe line 23, 24, 25, 51, 60, 61, 62, and 63, so that the centrifugal force of the circulating oil in the coupling will push on the masking vanes 57 and force the pistons 56 to the right and thereby permit entrance of the circulating oil into the vanes 53a of the runner 46, which will accelerate its speed and the drive will now be taken over by the pinion 66 and the runner 34 will idle along with the impeller 13, but the pinion 41 will turn faster and this is accommodated by the overrunning clutch "C."

The pinion 70, being smaller than the pinion 66, also rotates faster, so that when the runner 46 and pinion 66 rotate at seven-tenth engine speed, the pinion 70 will rotate at engine speed. The speed of the driven shaft 31 will then be seven-fifteenth that of the engine, but its torque will be one and one-half times that of the drive shaft 10.

Forward motion in "high" gear

The overrunning clutch "B" will prevent the pinion 70 from turning faster than the drive shaft 10, so that as the speed of the runner 46 and pinion 66 exceeds seven-tenth engine speed the cluster pinion housing 93 will be compelled to begin turning in the same direction as the drive shaft 10. This will be permitted by the overrunning clutch 98 without releasing the brake band 109, and as a result the speed of the driven shaft 31 will be increased.

As the speed of the runner 46 approaches the speed of the impeller 13 the speed of the driven shaft 31 also increases. For example, if the runner 46 has 2% slip the speed of the driven shaft 31 will be 96.45% of the drive shaft speed for the gear proportions stated above. The reaction assembly rotates then at 93.33% of the drive shaft speed in the forward direction.

It should also be noted that the torque capacity of the hydraulic coupling must be one and seven-ninth times the maximum engine torque, because the pinion 70 "feeds" back a large proportion of the "circulating" torque of the coupling, i. e. if the engine torque is taken as unity, then the pinion 70 "feeds back" seven-ninth times engine torque to the impeller 13 through the overrunning clutch "B" and the clutch plates 16 and 79, whence it is added to the engine torque. Therefore, one and seven-ninth engine torque must be transmitted to the runner 46 and pinion 66.

The latter delivers through the cluster pinions unity engine torque to underdrive gear 87 and hence seven-ninth engine torque to pinion 70 which "feeds" it back through clutch "B" and multiple plate clutch 16 and 79.

Whenever the speed of the vehicle is reduced due to increased torque demand the cluster pinion housing 93 will slow down and finally come to a halt, because its counter-rotation will be prevented by the overrunning clutch 98 and the brake band 109, which remains continuously applied as long as the transmission is conditioned in the "Drive" position and then torque multiplication will again take place.

Figure 13:
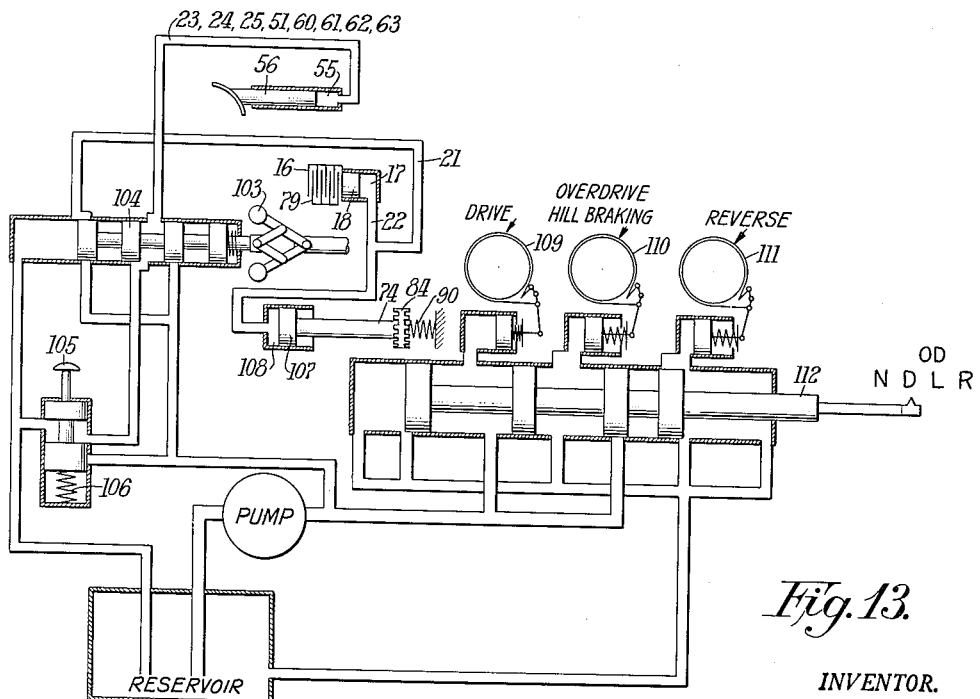
Figure 13 shows the control mechanism in still another intermediate position.

As soon as the vehicle attains a speed of approximately twenty-five miles per hour the governor 103 will have shifted the valve 104 to the position shown in Figure 13. In this position the pistons 18 and 107 will be relieved of oil pressure, the clutch plates 16, 79 will separate, whereby the overrunning clutch "B" is disconnected from the impeller 13 and the duplex jaw clutch 84 will become disengaged from the underdrive gear 87 by the spring 90 and become engaged with the clutch teeth 80 of the pinion 70. The overrunning clutch "D" previously described will prevent the cluster pinion housing 93 from overrunning the pinion 66 in the forward direction, so that the pinion 70 will be compelled to rotate at the same speed as that of the pinion 66, whereby the efficiency of the transmission has been increased from 96% to 98%.

The torque division is now somewhat different from that described above. Assuming again that 100 units of engine torque are transmitted to the runner 46 in direct drive to the driven shaft 31, there will be a "circulating" torque of 143 units at the pinion 66 which will be divided so that 43 units will be diverted to the cluster pinion housing 93 and which will "feed it back" through the overrunning clutch "D" to the pinion 66, and 100 units will be diverted to the pinion 70 and through the duplex jaw clutch 84 to the driven shaft 31.

Similarly, when the arrangement of the overrunning clutches 92a and 98a of Figure 17 is employed and whereby the overrunning clutch "D" may be dispensed with and when the duplex jaw clutch 84 is engaged with the clutch teeth 80 of the pinion 70 and 100 units of engine torque are transmitted from the runner 46 to the pinion 66 this torque will be divided so that 30 units will be diverted to the cluster pinion housing 93 and whence through the overrunning clutch 92a to the driven shaft 31, and the remaining 70 units of engine torque will be transmitted to the pinion 70 and then through the clutch 84 to the driven shaft 31.

In this latter arrangement the overrunning clutch 92a, therefore, not only provides a "lock-up" for direct drive, but it is also capable of preventing the vehicle from rolling backward when the brake wheel 100 is held by the brake band 109.

*Forward motion in "overdrive" gear*

Figure 14:
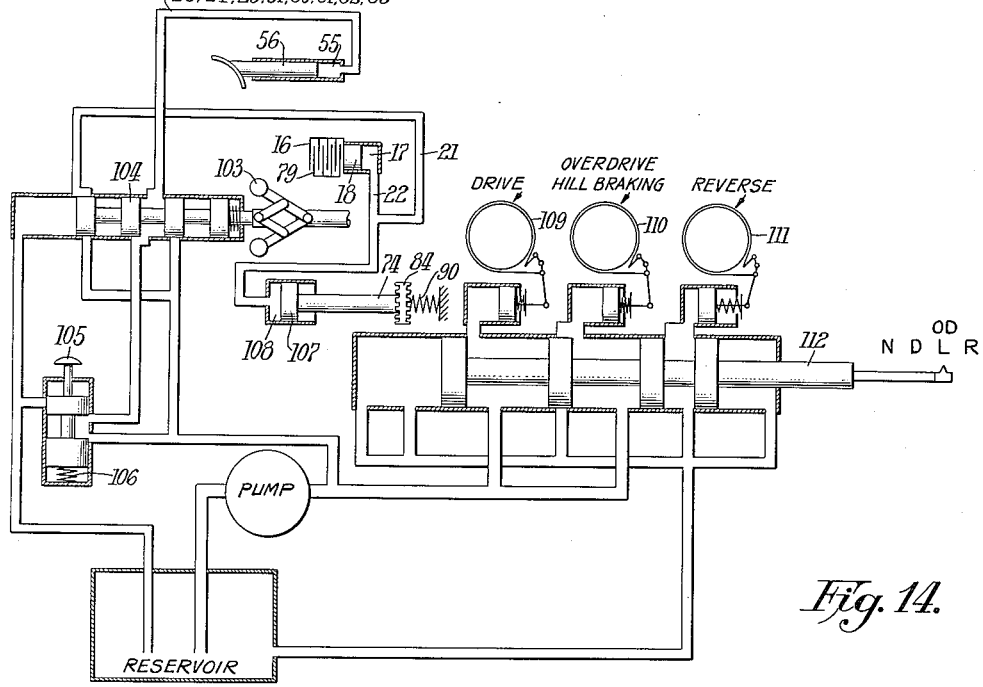
Figure 14 shows the control mechanism in the "Overdrive" position.

If the operator now moves the control lever into "Overdrive" position, shown in Figure 14, the valve 112 will permit pressure oil to apply the brake band 110 to the cluster pinion housing 93 preventing its rotation in the forward direction. The speed of the pinion 70 will now be ten-seventh times as fast as the speed of the pinion 66 or the driven shaft 31 will make approximately ten revolutions for seven revolutions of the drive shaft 10.

Under certain driving conditions it may become necessary to accelerate the vehicle as, for example, in passing another vehicle. For this purpose the foot-operated valve 105 is provided, which, if depressed will now permit the entry of pressure oil into the bores 55, as shown in Figure 14, and force pistons 56 to the left thereby blocking the entrance of the circulating oil in the coupling to the vanes 53a. The runner 34 will now "take over" the drive, pinion 41 will drive pinion 70 through the cluster pinions at a speed of five-seventh that of the pinion 41, at a ratio of 1.4 to 1.

Upon release of the valve 105 the pistons 56 will again recede and the drive will again be "taken over" by the runner 46 and "overdrive" will be resumed.

*Down-hill braking.*—When descending steep hills the vehicle would attain excessive speed, unless the wheel brakes were applied, and because there is no direct mechanical connection between the input and the output shafts and the cluster pinion housing cannot be held in the forward direction by the brake band 109, an additional brake band 110 may be applied and thereby the engine can be used to hold back the vehicle when descending a steep hill.

Figure 15:
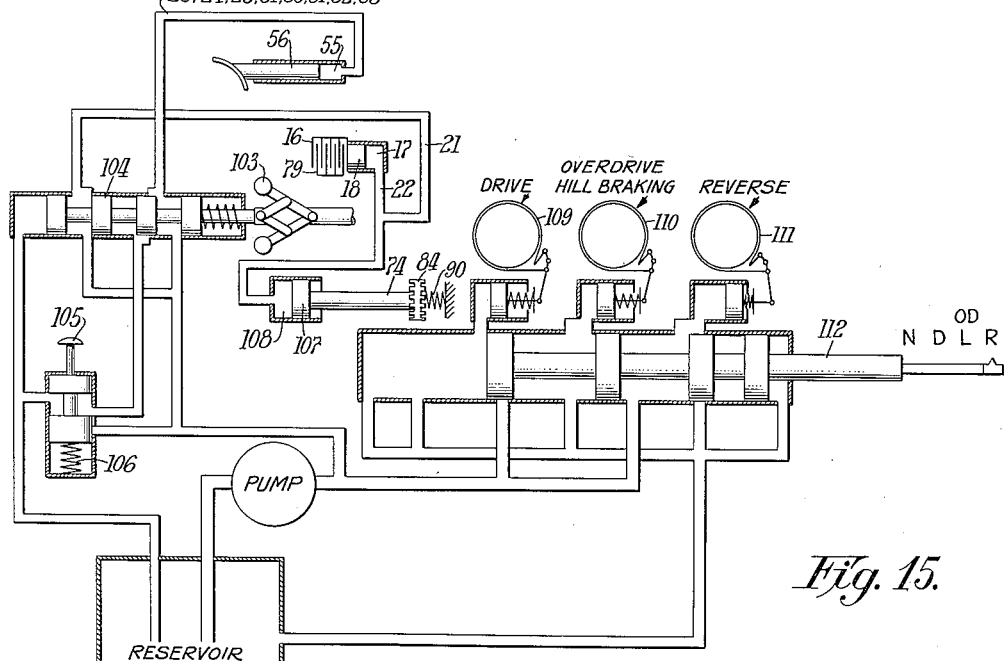
Figure 15 shows the control mechanism in the "Reverse" position.

*Reverse operation.*—To produce "reverse" operation of the transmission, the control lever is moved to the "reverse" position, shown in Figure 15. The brake band 111 will be applied, and the brake bands 109 and 110 will be free, pressure oil being delivered into its brake cylinder, stopping the rotation of the runner 46 and pinion 66. Pressure oil will also force the pistons 56 with the vanes 57 to the left against the stops 58.

When the engine is speeded up, the runner 34 will be accelerated and the pinion 41 will cause the housing 93 with its cluster pinions to planet around the now stationary pinion 66 at the same speed, but in the opposite direction from that of the driving pinion 41. The output shaft 31 will now turn in "reverse" at one-third the speed of the pinion 41 and the output torque is now three times that of the input shaft.

The "no-roll-back" overrunning device 92 is automatically rendered ineffective because the housing 93 now turns three times faster in the same direction as the output shaft 31.

From the foregoing, it will be seen that my invention provides for an automatic transmission having multiple underdrive forward speed ranges, as well as an overdrive speed, and a reverse speed, which makes it suitable for passage type automotive vehicles and the like. The net result is a transmission that possesses extreme simplicity, can be produced economically, serviced easily and in which the changes from one speed ratio to another take place without any perceptible shock in the driving train.

I claim:

1. In a transmission having driving and driven shafts; a plurality of intermediate shafts arranged in telescoping relation with each other and with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation in one direction, an overrunning clutch between said frame and brake means for permitting rotation of said frame in a direction opposite to the said one direction, means for coupling said driving shaft first with the one of said intermediate shafts having the smallest sun gear thereon and then with the other of said intermediate shafts having the largest sun gear thereon, clutch means on a third of the sun gears on said intermediate shafts which is intermediate the size of the said other two sun gears on said intermediate shafts, clutch means on said sun gear rotatable on said driven shaft, and clutch means movable on and drivingly connected to said driven shaft engageable with the said clutch means on said sun gears for coupling said driven shaft to the sun gear rotatable on said driven shaft or to the said third sun gear.

2. In a transmission having driving and driven shafts; a plurality of intermediate shafts arranged in telescoping relation with each other and coaxial with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation, in one direction, an overrunning clutch between said frame and brake means for permitting rotation of said frame in a direction opposite to the said one direction, means for coupling said driving shaft first with the one of said intermediate shafts having the smallest sun gear thereon and then with the other of said intermediate shafts having the largest sun gear thereon, clutch means on a third of the sun gears on said intermediate shafts which is intermediate the size of the said other two sun gears on said intermediate shafts, clutch means on said sun gear rotatable on said driven shaft, hydraulically actuated clutch means movable on and drivingly connected to said driven shaft cooperable with said clutch means on said sun gears for coupling said driven shaft first to the sun gear rotatable on said driven shaft and then to the said third sun gear.

3. In a transmission having driving and driven shafts; a plurality of intermediate shafts arranged in telescoping relation with each other and with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation, means for coupling said driving shaft first with the one of said intermediate shafts having the smallest sun gear thereon and then with the other of said intermediate shafts having the largest sun gear thereon, clutch means on a third of said sun gears on an intermediate shaft which is intermediate the size of the other two sun gears on said intermediate shafts, clutch means on the sun gear rotatable on the driven shaft, clutch means movable on and drivingly connected to the driven shaft adapted for selective engagement with said clutch means on said sun gears for coupling said driven shaft to the sun gear rotatable on said driven shaft to provide an underdrive speed ratio when the drive shaft is coupled with the said smallest or largest sun gear, and for coupling said driven shaft to said third sun gear for providing an overdrive speed ratio when the drive shaft is coupled with said largest sun gear.

4. In a transmission having driving and driven shafts; a plurality of intermediate shafts arranged in telescoping relation with each other and coaxial with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation, means for coupling said driving shaft first with one of said intermediate shafts having the smallest sun gear thereon and then with the other of said intermediate shafts having the largest sun gear thereon, clutch means on the sun gear of a third of said intermediate shafts, said last-mentioned sun gear being intermediate the size of the other two sun gears on said intermediate shafts, clutch means on the sun gear rotatable on the driven shaft, clutch means movable on and drivingly connected to the driven shaft adapted for selective engagement with said clutch means on said sun gears for coupling said driven shaft to the sun gear rotatable on said driven shaft to provide an underdrive speed for the driven shaft when the drive shaft is coupled with the smallest or the largest of said sun gears, and for coupling the driven shaft to the sun gear on said third intermediate shaft to provide an overdrive speed for the driven shaft when the drive shaft is coupled with said largest sun gear.

5. In a transmission having driving and driven shafts; three intermediate shafts arranged in telescoping relation with each other and coaxial with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation in one direction, an overrunning clutch between said frame and brake means for permitting rotation of said frame in a direction opposite to the said one direction, means for coupling said driving shaft first with the one of said intermediate shafts having the smallest sun gear thereon and then with the one of said intermediate shafts having the largest sun gear thereon, overrunning clutch means between the third of said intermediate shafts and the drive shaft to prevent said third intermediate shaft from rotating at a speed faster than the drive shaft, said sun gear on the third intermediate shaft being intermediate the size of the other two sun gears on said intermediate shafts, clutch means on the sun gear rotatable on the driven shaft, hydraulically actuated clutch means movable on and drivingly connected to the driven shaft adapted for selective engagement with the said clutch means on said sun gear for coupling said driven shaft first to the sun gear rotatable on said driven shaft, so that when the driving shaft is coupled to the intermediate shaft having the largest sun gear thereon the third intermediate shaft being unable to overrun the driving shaft compels the frame with the cluster planet gear means and the said driven shaft to turn in the same direction and speed as the driving shaft.

6. In a transmission having driving and driven shafts; three intermediate shafts arranged in telescoping relation with each other and coaxial with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation in one direction, an overrunning clutch between said frame and brake means for permitting rotation of said frame in a direction opposite to the said one direction, impositive drive means for coupling said driving shaft first with one of said intermediate shafts having the smallest sun gear thereon and then with the other of said intermediate shafts having the largest sun gear thereon, overrunning clutch means between said third intermediate shaft and the drive shaft to prevent said third intermediate shaft from rotating at a speed faster than the drive shaft, said sun gear on the third intermediate shaft, being intermediate the size of the other two sun gears on said intermediate shafts, clutch means on the sun gear rotatable on the driven shaft, hydraulically actuated clutch means movable on and drivingly connected to the driven shaft adapted for selective engagement with the said clutch means on the sun gear rotatable on the driven shaft for coupling said driven shaft to the sun gear rotatable on said driven shaft, so that when the driving shaft is coupled to the intermediate shaft having the largest sun gear thereon the third intermediate shaft being unable to overrun the driving shaft compels the frame with the cluster planet gear means and said driven shaft to turn in the same direction and speed as the driving shaft.

7. In a transmission having driving and driven shafts; three intermediate shafts arranged in telescoping relation with each other and coaxial with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, overrunning clutch means between said frame and one of the intermediate shafts, brake means selectively engageable for holding said frame against rotation in one direction, an overrunning clutch between said frame and brake means for permitting rotation of said frame in a direction opposite to the said one direction, impositive drive means for coupling said driving shaft with one of said intermediate shafts having the smallest sun gear thereon, means for coupling said driving shaft with another of said intermediate shafts having the largest sun gear thereon without first disconnecting said driving shaft from the intermediate shaft having the smallest sun gear thereon, overrunning clutch means between said third intermediate shaft and the driving shaft to prevent said third intermediate shaft from rotating at a speed faster than the drive shaft, clutch means on the sun gear of said third intermediate shaft, said sun gear being intermediate the size of the other two sun gears on said intermediate shafts, clutch means on the sun gear rotatable on the driven shaft, clutch means movable on and drivingly connected to the driven shaft adapted for selective engagement with the clutch means on said sun gears for coupling said driven shaft first to the sun gear rotatable on said driven shaft, or second with the sun gear on said third intermediate shaft, so that when said movable clutch means is so engaged and the driving shaft is coupled first with the intermediate shaft having the smallest sun gear the driven shaft will turn in an underdrive ratio and when coupled to the intermediate shaft having the largest sun gear the driven shaft will turn in direct drive ratio.

8. In a transmission having driving and driven shafts; three intermediate shafts arranged in telescoping relation with each other and coaxial with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation in one direction, an overrunning clutch between said frame and brake means for permitting rotation of said frame in a direction opposite to the said one direction, overrunning clutch means between said frame and said driven shaft, impositive drive means for coupling said driving shaft with one of said intermediate shafts having the smallest sun gear thereon, means for coupling said driving shaft with another of said intermediate shafts having the largest sun gear thereon without first disconnecting said driving shaft from the intermediate shaft having the smallest sun gear thereon, overrunning clutch means between said third intermediate shaft and the driving shaft to prevent said third intermediate shaft from rotating at a speed faster than the driving shaft, clutch means on the sun gear of said third intermediate shaft, said sun gear being intermediate the size of the other two sun gears on said intermediate shafts, clutch means on the sun gear rotatable on the driven shaft, hydraulically actuated clutch means movable on and drivingly connected to the driven shaft selectively engageable with the clutch means on said sun gears for coupling said driven shaft first to the sun gear rotatable on said driven shaft, or second with the sun gear on said third intermediate shaft, said brake means permitting rotation of the driven shaft in its forward direction, but preventing rotation thereof in the opposite direction when said brake means is actuated.

9. In a transmission having driving and driven shafts; three intermediate shafts arranged in telescoping relation with each other and coaxial with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation in one direction, an overrunning clutch between said frame and brake means for permitting rotation of said frame in a direction opposite to the said one direction, overrunning clutch means between said frame and said driven shaft, impositive drive means for coupling said driving shaft with one of said intermediate shafts having the smallest sun gear thereon, means for coupling said driving shaft with another of said intermediate shafts having the largest sun gear thereon without first disconnecting said driving shaft from the intermediate shaft having the smallest sun gear thereon, overrunning clutch means between said third intermediate shaft and the driving shaft to prevent said third intermediate shaft from rotating at a speed faster than the driving shaft, clutch means on the sun gear of said third intermediate shaft, said sun gear being intermediate the size of the other two sun gears on said intermediate shafts, clutch means on the sun gear rotatable on the driven shaft, clutch means movable on and drivingly connected to the driven shaft selectively engageable with the clutch means on said sun gears for coupling said driven shaft first to the sun gear rotatable on said driven shaft, or second with the sun gear on said third intermediate shaft, said overrunning clutch means between said frame and the driven shaft compelling said driven shaft to rotate in the same direction and at the same speed as the driving shaft, and said brake means permitting rotation of the driven shaft in its forward direction but preventing rotation thereof in the opposite direction when said brake means is actuated.

10. In a transmission having driving and driven shafts; three intermediate shafts arranged in telescoping relation with each other and coaxial with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, a first brake means selectively engageable for holding said frame against rotation in one direction, an overrunning clutch between said frame and brake means for permitting rotation of said frame in a direction opposite to the said one direction, drive means for coupling said driving shaft with one of said intermediate shafts having the smallest sun gear thereon, means for coupling said driving shaft with another of said intermediate shafts having the largest sun gear thereon, a second brake means selectively engageable for holding said largest sun gear against rotation, overrunning clutch means between said third intermediate shaft and the driving shaft to prevent said third intermediate shaft from rotating at a speed faster than the driving shaft, clutch means on the sun gear of said third intermediate shaft, said sun gear being intermediate the size of the other two sun gears on said intermediate shafts, clutch means on the sun gear rotatable on the driven shaft, clutch means movable on and drivingly connected to the driven shaft selectively engageable with the clutch means on said sun gears for coupling said driven shaft first to the sun gear rotatable on the driven shaft, or second with the sun gear on said third intermediate shaft, so that when the first brake means is released and the second brake means is engaged and the driving shaft is coupled to the intermediate shaft having the smallest sun gear thereon and said movable clutch means is coupled to the sun gear rotatable on said driven shaft, rotation of the driven shaft will be in a direction opposite to that of the driving shaft, but at a reduced speed and increased torque.

11. In a transmission having driving and driven shafts; a plurality of intermediate shafts arranged in telescoping relation with each other and with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation in one direction, an overrunning clutch between said frame and brake means for permitting rotation of said frame in a direction opposite to the said one direction, a fluid coupling having an impeller connected to said driving shaft, having a first runner connected to the one of said intermediate shafts with the smallest sun gear thereon and a second runner connected to the one of said intermediate shafts with the largest sun gear thereon, clutch means on a third of said sun gears on said intermediate shafts which is intermediate the size of said other two sun gears on said intermediate shafts, clutch means on said sun gear rotatable on said driven shaft, clutch means movable on and drivingly connected to said driven shaft selectively engageable with the clutch means on said sun gears for coupling said driven shaft first to the sun gear rotatable on said driven shaft and second to the said third sun gear.

12. In a transmission having driving and driven shafts; a plurality of intermediate shafts arranged in telescoping relation with each other and with said driving and driven shafts, sun gears of respectively different sizes on said intermediate shafts, a sun gear rotatable on and supported by said driven shaft, cluster planet gear means meshing with said sun gears, a frame rotatable on the axis of said shafts and rotatably supporting said cluster planet gear means, brake means selectively engageable for holding said frame against rotation in one direction, an overrunning clutch between said frame and brake means for permitting rotation of said frame in a direction opposite to the said one direction, a fluid coupling having an impeller connected to said driving shaft, having a first runner connected to one of said intermediate shafts with the smallest sun gear thereon and a second runner connected to the one of said intermediate shafts with the largest sun gear thereon, clutch means on a third of said sun gears on said intermediate shafts which is intermediate the size of said other two sun gears on said intermediate shafts, clutch means on said sun gear rotatable on said driven shaft, hydraulically actuated clutch means movable on and drivingly connected to said driven shaft selectively engageable with the clutch means on said sun gears for coupling said driven shaft first to the sun gear rotatable on said driven shaft and second to the said third sun gear.

13. In a transmission having driving and driven shafts; a plurality of intermediate shafts arranged in telescoping relation with each other and with said driving and driven shafts, sun gears of respectively different sizes on said intermediate shafts, a sun gear of still larger size rotatable on and supported by said driven shaft, cluster planet gear means meshing with said sun gears, a frame rotatable on the axle of said shafts and rotatably supporting said cluster planet gear means, brake means selectively engageable for holding said frame against rotation in one direction, an overrunning clutch between said frame and brake means for permitting rotation of said frame in a direction opposite to the said one direction, a fluid coupling having an impeller connected to said driving shaft, having a first runner connected to one of said intermediate shafts with the smallest sun gear thereon and a second runner connected to the one of said intermediate shafts with the largest sun gear thereon, clutch means on a third of said sun gears on said intermediate shafts which is intermediate the size of said other two sun gears on said intermediate shafts, clutch means movable on and drivingly connected to the driven shaft, clutch means on the sun gear rotatable on said driven shaft, said clutch means on the shaft being selectively engageable with said clutch means on the sun gears, a second brake means for holding said frame in the direction in which said first brake means is ineffective, whereby underdrive speed ratios are provided when said first brake means is applied and said movable clutch means is engaged with the sun gear rotatable on said driven shaft, and an overdrive speed ratio is provided when said second brake means is applied and said movable clutch means is engaged with said third sun gear of said intermediate shafts.

14. In a transmission having driving and driven shafts; three intermediate shafts arranged in telescoping relation with each other and coaxial with said driving and driven shafts, sun gears of respectively different sizes on said intermediate shafts, a sun gear of still larger size rotatable on and supported by said driven shaft, cluster planet gear means meshing with said sun gears, a frame rotatable on the axis of said shafts and rotatably supporting said cluster planet gear means, brake means selectively engageable for holding said frame against rotation in one direction, an overrunning clutch between said frame and brake means for permitting rotation of said frame in a direction opposite to the said one direction, a fluid coupling having an impeller connected to said driving shaft, having a first runner connected to one of said intermediate shafts with the smallest sun gear thereon and a second runner connected to the one of said intermediate shafts with the largest sun gear thereon, overrunning clutch means between said third intermediate shaft and the driving shaft to prevent said third intermediate shaft from rotating at a speed faster than the driving shaft, clutch means on the sun gear of said third intermediate shaft, said sun gear being intermediate the size of said other two sun gears on said intermediate shafts, hydraulically actuated clutch means movable on and drivingly connected to the driven shaft, clutch means on the sun gear rotatable on the driven shaft, said clutch means on the shaft being selectively engageable with said clutch means on the sun gears, whereby underdrive speed ratios are provided when said brake means is applied and said movable clutch means is engaged with the sun gear rotatable on said driven shaft, and still another underdrive speed ratio becomes available when the first runner alone is active and the movable clutch means is engaged with the said third sun gear.

15. In a transmission having driving and driven shafts; three intermediate shafts arranged in telescoping relation with each other and coaxial with said driving and driven shafts, sun gears of respectively different sizes on said intermediate shafts, a sun gear of still larger size rotatable on and supported by said driven shaft, cluster planet gear means meshing with said sun gears, a frame rotatable on the axis of said shafts and rotatably supporting said cluster planet gear means, brake means selectively engageable for holding said frame against rotation in one direction, an overrunning clutch between said frame and brake means for permitting rotation of said frame in a direction opposite to the said one direction, a fluid coupling having an impeller connected to said driving shaft, having a first runner, impositive drive means connecting said first runner to the one of said intermediate shafts with the smallest sun gear thereon and a second runner connected to the other of said intermediate shafts with the largest sun gear thereon, selectively engageable clutch means and overrunning clutch means serially arranged between said third intermediate shaft and the driving shaft to prevent said third intermediate shaft from rotating at a speed faster than the driving shaft, clutch means on the sun gear of said third intermediate shaft, said sun gear being intermediate the size of said other two sun gears on said intermediate shafts, clutch means movable on and drivingly connected to the driven shaft, clutch means on the sun gear rotatable on the driven shaft, said clutch means on the shaft being selectively engageable with said clutch means on the sun gears, a second brake means for holding said frame in the direction in which said first brake means is ineffective, whereby underdrive speed ratios and a direct drive speed ratio are provided when said first brake means is applied and said movable clutch means is engaged with the sun gear rotatable on said driven shaft, and an overdrive speed ratio is provided when said second brake means is applied and said movable clutch means is engaged with the clutch means of the sun gear on said third intermediate shaft and said selectively engageable clutch means between the third intermediate shaft and the driving shaft is disengaged.

16. In a transmission having driving and driven shafts; three intermediate shafts arranged in telescoping relation with each other and coaxial with said driving and driven shafts, sun gears of respectively different sizes on said intermediate shafts, a sun gear of still larger size rotatable on and supported by said driven shaft, cluster planet gear means meshing with said sun gears, a frame rotatable on the axis of said shafts and rotatably supporting said cluster planet gear means, first brake means selectively engageable for holding said frame against rotation in one direction, an overrunning clutch between said frame and brake means for permitting rotation of said frame in a direction opposite to the said one direction, a fluid coupling having an impeller connected to said driving shaft, having a first runner with impositive drive means connected to the one of said intermediate shafts with the smallest sun gear thereon and a second runner connected to the one of said intermediate shafts with the largest sun gear thereon, hydraulically actuated and selectively engageable clutch means and overrunning clutch means between said third intermediate shaft and the driving shaft to prevent said third intermediate shaft from rotating at a speed faster than the driving shaft, clutch means on the sun gear of said third intermediate shaft, said sun gear being intermediate the size of said other two sun gears on said intermediate shafts, hydraulically actuated clutch means movable on and drivingly connected to the driven shaft, clutch means on the sun gear rotatable on the driven shaft, said clutch means on the shaft being selectively engageable with said clutch means on the sun gears, a second brake means for holding said frame in the direction in which said first brake means is ineffective, whereby underdrive speed ratios and a direct drive speed ratio are provided when said first brake means is applied and said movable clutch means is engaged with the sun gear rotatable on said driven shaft, and an overdrive speed ratio is provided when said second brake means is engaged and said movable clutch means is engaged with the clutch means of the sun gear on said third intermediate shaft and said selectively engageable clutch means between said third intermediate shaft and the driving shaft is disengaged.

17. In a transmission having driving and driven shafts; three intermediate shafts arranged in telescoping relation with each other and coaxial with said driving and driven shafts, sun gears of respectively different sizes on said intermediate shafts, a sun gear of still larger size rotatable on and supported by said driven shaft, cluster planet gear means meshing with said sun gears, a frame rotatable on the axis of said shafts and rotatably supporting said cluster planet gear means, overrunning clutch means between said frame and one of the intermediate shafts, first brake means selectively engageable for holding said frame against rotation in one direction, an overrunning clutch between said frame and brake means for permitting rotation of said frame in a direction opposite to the said one direction, a fluid coupling having an impeller connected to said driving shaft, having a first runner with impositive drive means connected to the one of said intermediate shafts with the smallest sun gear thereon and a second runner connected to the one of said intermediate shafts with the largest sun gear thereon, hydraulically actuated and selectively engageable clutch means and overrunning clutch means serially arranged between said third intermediate shaft and the driving shaft to prevent said third intermediate shaft from rotating at a speed faster than the driving shaft, clutch means on the sun gear of said third intermediate shaft, said sun gear being intermediate the size of said other two sun gears on said intermediate shafts, hydraulically actuated clutch means movable on and drivingly connected to the driven shaft, clutch means on the sun gear rotatable on the driven shaft, said clutch means on the shaft being selectively engageable with said clutch means on the sun gears, a second brake means for holding said frame in the direction in which said first brake means is ineffective, whereby underdrive speed ratios and an approximately direct drive speed ratio are provided when said first brake means is applied and said movable clutch means is engaged with the sun gear rotatable on the driven shaft, and a second more efficient direct drive speed ratio is provided when said movable clutch means is engaged with the clutch means of the sun gear on said third intermediate shaft, and an overdrive speed ratio is provided upon application of said second brake means and upon release of said selectively engageable clutch means between the third intermediate shaft and the driving shaft.

18. In a transmission having driving and driven shafts; three intermediate shafts arranged in telescoping relation with each other and coaxial with said driving and driven shafts, sun gears of respectively different sizes on said intermediate shafts, a sun gear of still larger size rotatable on and supported by said driven shaft, cluster planet gear means meshing with said sun gears, a frame rotatable on the axis of said shafts and rotatably supporting said cluster planet gear means, first brake means selectively engageable for holding said frame against rotation in one direction, an overrunning clutch between said frame and brake means for permitting rotation of said frame in a direction opposite to the said one direction, overrunning clutch means between said frame and said driven shaft, a fluid coupling having an impeller connected to said driving shaft, having a first runner with impositive drive means connected to one of said intermediate shafts with the smallest sun gear thereon and a second runner connected to the other of said intermediate shafts with the largest sun gear thereon, hydraulically actuated and selectively engageable clutch means and overrunning clutch means between said third intermediate shaft and the driving shaft to prevent said third intermediate shaft from rotating at a speed faster than the driving shaft, clutch means on the sun gear of said third intermediate shaft, said sun gear being intermediate the size of said other two sun gears on said intermediate shafts, hydraulically actuated clutch means movable on and drivingly connected to the driven shaft, clutch means on the sun gear rotatable on the driven shaft, a second brake means for holding said frame in the direction in which said first brake means is ineffective, whereby underdrive speed ratios and an approximate direct drive speed ratio are provided when said first brake means is applied and said movable clutch means is engaged with the clutch means of the sun gear rotatable on the driven shaft, and a second more efficient direct drive speed ratio is provided when said movable clutch means is engaged with the clutch means of the sun gear on said third intermediate shaft, and an overdrive speed ratio is provided upon application of said second brake means and upon release of said selectively engageable clutch means.

19. In a transmission having driving and driven shafts; three intermediate shafts arranged in telescoping relation with each other and coaxial with said driving and driven shafts, sun gears of respectively different sizes on said intermediate shafts, a sun gear of still larger size rotatable on and supported by said driven shaft, cluster planet gear means meshing with said sun gears, a frame rotatable on the axis of said shafts and rotatably supporting said cluster planet gear means, first brake means selectively engageable for holding said frame against rotation in one direction, an overrunning clutch between said frame and brake means for permitting rotation of said frame in a direction opposite to the said one direction, overrunning clutch means between said frame and said driven shaft, a fluid coupling having an impeller connected to said driving shaft, having a first runner with impositive drive means connected to the one of said intermediate shafts with the smallest sun gear thereon and a second runner connected to the one of said intermediate shafts with the largest sun gear thereon, hydraulically actuated and selectively engageable clutch means and overrunning clutch means serially arranged between said third intermediate shaft and the driving shaft to prevent said third intermediate shaft from rotating at a speed faster than the driving shaft, clutch means on the sun gear of said third intermediate shaft, said sun gear being intermediate the size of said other two sun gears on said intermediate shafts, hydraulically actuated clutch means movable on and drivingly connected to the driven shaft, clutch means on the sun gear rotatable on the driven shaft, said clutch means on the shaft being selectively engageable with said clutch means on the sun gears, a second brake means for holding said frame in the direction in which said first brake means is ineffective, whereby the overrunning clutch means between said brake and the driven shaft prevents rotation of said driven shaft in a direction opposite to that of the driving shaft when said first and/or second brake means is applied and when said movable clutch means is engaged with the clutch means of the sun gear on said third intermediate shaft said overrunning clutch means compels said driven shaft to rotate in the same direction and speed as that of the second runner, and whereby the driven shaft may rotate at a reduced speed but increased torque when the said first runner alone is drivingly active.

20. In a transmission having driving and driven shafts; three intermediate shafts arranged in telescoping relation with each other and coaxial with said driving and driven shafts, sun gears of respectively different sizes on said intermediate shafts, a sun gear of still larger size rotatable on and supported by said driven shaft, cluster planet gear means meshing with said sun gears, a frame rotatable on the axis of said shafts and rotatably supporting said cluster planet gear means, first brake means selectively engageable for holding said frame against rotation in one direction, an overrunning clutch between said frame and brake means for permitting rotation of said frame in a direction opposite to the said one direction, overrunning clutch means between said frame and the driven shaft, a fluid coupling having an impeller connected to said driving shaft, having a first runner with impositive drive means connected to the one of said intermediate shafts with the smallest sun gear thereon and a second runner connected to the one of said intermediate shafts with the largest sun gear thereon, hydraulically actuated and selectively engageable clutch means and overrunning clutch means serially arranged between said third intermediate shaft and the driving shaft to prevent said third intermediate shaft from rotating faster than the speed of the driving shaft, clutch means on the sun gear of said intermediate shaft, said sun gear being intermediate the size of said other two sun gears on said intermediate shafts against rotation, hydraulically actuated clutch means movable on and drivingly connected to the driven shaft, clutch means on the sun gear rotatable on the driven shaft, said clutch means on the shaft being selectively engageable with said clutch means on the sun gears, a second brake means selectively engageable for holding said largest sun gear on one of said intermediate shafts, so that when said first brake means is released and said first runner is drivingly active and said movable clutch means is coupled to the sun gear rotatable on the driven shaft, rotation thereof will be in a direction opposite to that of the driving shaft, but at reduced speed and increased torque.

21. In combination in a transmission; a driving shaft, a driven shaft, first and second intermediate shafts, a fluid coupling coupling the driving shaft with said first intermediate shaft, first larger sun gear and a second smaller sungear on said first and second intermediate shafts, respectively, a third sun gear intermediate the sizes of said first and second sun gears rotatably mounted on said driven shaft, cluster planet pinion means meshing with said sun gears, an overrunning clutch and a hydraulically operated clutch arranged in series between said driving shaft and said second intermediate shaft, a clutch member drivingly connected with said driven shaft and normally drivingly engaged with said second sun gear, and fluid operable means for energizing said hydraulically actuated clutch means, while simultaneously moving said clutch member out of driving engagement with said second sun gear and into driving engagement with said third sun gear, said overrunning clutch being operable when said hydraulically actuated clutch means is energized for preventing said second intermediate shaft from overrunning said driving shaft, a carrier for said cluster planet pinion means, and brake means operable for preventing rotation of said carrier in at least one direction.

22. An arrangement as set forth in claim 21 including, means operable for preventing rotation of said carrier in the same direction as said first sun gear at a greater speed than the said first sun gear.

23. An arrangement as set forth in claim 22 including in addition thereto, means selectively operable to hold said carrier against rotation in either direction.

24. An arrangement as set forth in claim 21 including, speed responsive means for making said fluid operable means effective.

25. In a transmission having driving and driven shafts; a plurality of intermediate shafts arranged in coaxial telescoping relation and also coaxial with said driving and driven shafts, sun gears of respectively different sizes fixed to said intermediate shafts, a sun gear of still another size rotatable on said driven shaft, cluster planet pinion means meshing with said sun gears, a frame rotatable on the axis of said shafts supporting said cluster planet pinion means, means for selectively holding said frame against rotation in one direction, a fluid coupling having an impeller connected to said driving shaft and also having a first runner connected to the one of said intermediate shafts having the smallest sun gear thereon and a runner connected to the one of said intermediate shafts having the largest sungear thereon, and means for selectively clutching said driven shaft to the said sun gear rotatable thereon, or to the one of said sun gears on said intermediate shafts which is intermediate the size of the sun gears on the intermediate shafts connected with the runners of said fluid coupling.

References Cited in the file of this patent

UNITED STATES PATENTS

| | | |
|---|---|---|
| 2,277,214 | Dodge | Mar. 24, 1942 |
| 2,346,365 | Duffield | Apr. 11, 1944 |
| 2,371,574 | Swennes | Mar. 13, 1945 |
| 2,378,577 | Oldfield | June 19, 1945 |
| 2,433,003 | Swennes | Dec. 23, 1947 |
| 2,584,965 | McFarland | Feb. 5, 1952 |
| 2,598,501 | Burnett | May 27, 1952 |
| 2,609,708 | Burnett | Sept. 9, 1952 |